United States Patent
Suzuki et al.

[11] Patent Number: 5,642,357
[45] Date of Patent: Jun. 24, 1997

[54] TRANSMISSION SIGNAL PROCESSING CIRCUIT WHICH CAN DETERMINE AN OPTIMUM STUFF THRESHOLD VALUE CORRESPONDING TO A SORT OF A TRIBUTARY UNIT OF AN INPUT SIGNAL

[75] Inventors: Makoto Suzuki; Yoshinori Rokugo, both of Tokyo, Japan

[73] Assignee: NEC Corporation, Japan

[21] Appl. No.: 578,079

[22] Filed: Dec. 27, 1995

[30] Foreign Application Priority Data

Dec. 27, 1994 [JP] Japan .................................. 6-326305

[51] Int. Cl.$^6$ .................................................. H04J 3/07
[52] U.S. Cl. ........................ 370/505; 370/516; 370/545
[58] Field of Search .......................... 370/100.1, 105.1, 370/105.3, 102, 112, 505, 516, 545; 375/354, 362, 371

[56] References Cited

U.S. PATENT DOCUMENTS

| | | | |
|---|---|---|---|
| 4,811,340 | 3/1989 | McEachern et al. | 370/102 |
| 5,168,494 | 12/1992 | Mueller | 370/84 |
| 5,263,057 | 11/1993 | Nawrocke et al. | 370/102 |
| 5,276,688 | 1/1994 | Urbansky | 370/102 |
| 5,331,641 | 7/1994 | Parruck et al. | 370/102 |
| 5,337,315 | 8/1994 | Ehrlich | 370/102 |

FOREIGN PATENT DOCUMENTS 2-81527  3/1990  Japan .

*Primary Examiner*—Douglas W. Olms
*Assistant Examiner*—Kwang Bin Yao
*Attorney, Agent, or Firm*—Ostrolenk, Faber, Gerb & Soffen, LLP

[57] ABSTRACT

On transferring a tributary unit (TU) from an input frame of an input signal (10) onto an output frame of an output signal (11), a recognition circuit (14) recognizes the TU of the input frame and produces not only a location signal representative of a location of the TU in the input frame But also a sort signal representative of a sort of the TU in the input frame. A threshold determining circuit (32) determines an optimum stuff threshold value (33) in response to the sort signal to produce the optimum stuff threshold value. A write controller (15) controls writing of the TU of the input frame in a memory (12) in response to the location signal by supplying a write address signal (17) to the memory. A read controller (18) controls reading of the TU out of the memory in response to a stuff request signal (19) by supplying a read address signal (23) to the memory. A stuff execution judgement circuit (25) judges whether or not a stuff operation should be executed by comparing a phase difference between the write address signal and the read address signal with the optimum stuff threshold value. The stuff execution judgement circuit produces the stuff request signal when the stuff execution judgement circuit judges that the stuff operation should be executed. An output transmission signal producing circuit (29, 30) produce the output signal including the TU in the output frame.

4 Claims, 4 Drawing Sheets

TRANSMISSION SIGNAL PROCESSING CIRCUIT WHICH CAN DETERMINE AN OPTIMUM STUFF THRESHOLD VALUE CORRESPONDING TO A SORT OF A TRIBUTARY UNIT OF AN INPUT SIGNAL

BACKGROUND OF THE INVENTION

This invention relates to a synchronous digital multiplexing transmission device for dealing with an input transmission signal based on a synchronous digital hierarchy (SDH) and, more particularly, to a transmission signal processing circuit for use in the synchronous digital multiplexing transmission device in processing the input transmission signal into an output transmission signal.

A transmission signal processing circuit of the type described is supplied from a transmission line with an input transmission signal which comprises an input frame (namely, a transmission line frame). The input frame (or the transmission line frame) comprises an input pointer and a datum which is typically a tributary unit (TU). The input pointer designates a location of a leading edge of the TU in the input frame. The transmission signal processing circuit processes the input transmission signal into an output transmission signal comprising an output frame (namely, a device frame). The output frame (or the device frame) comprises an output pointer and the TU. The output pointer designates another location of the leading edge of the TU in the output frame. Thus, the transmission signal processing circuit transfers the TU from the input frame onto the output frame. Inasmuch as the transmission signal processing circuit carries out renewal of a pointer from the input pointer to the output pointer, the transmission signal processing circuit is called a TU pointer processing circuit as known in the art.

In a multiplexing structure according to a synchronous digital hierarchy (SDH) based on ITU-T (Telecommunication Standardization Sector of International Telecommunication Union: previously CCITT) Recommendation G709, the TU is defined as a frame used in multiplexing digital signals. On multiplexing the digital signals having a bit rate of 1.544 Mbits/s in common, use is made of a TU-11 as the TU. When the digital signals have another bit rate of 2.048 Mbits/s in common, use is made of a TU-12 as the TU. For the digital signals having still another bit rate of 6.312 Mbits/s in common, use is made of a TU-2 as the TU. On multiplexing the digital signals which have either a higher bit rate of 34.368 Mbits/s or a still higher bit rate of 44.736 Mbits/s in common, a TU-3 is used as the TU. Thus, the TU's of four sorts or types (namely, the TU-11, the TU-12, the TU-2, and the TU-3) are present in correspondence to signal rates (or the bit rates) of the digital signals.

As will later be described in detail, a conventional transmission signal processing circuit includes a write controller which controls writing of the tributary unit of the input frame in a memory in response to a location signal representative of a location of the TU in the input frame by supplying a write address signal to the memory. A read controller controls reading of the tributary unit out of the memory in response to a stuff request signal by supplying a read address signal to the memory. A stuff execution judgement circuit is given an input stuff threshold value and judges whether or not a stuff operation should be executed by comparing a difference between the write address signal and the read address signal with the input stuff threshold value. The stuff execution judgement circuit produces the stuff request signal when the stuff execution judgement circuit judges that the stuff operation should be executed.

In the conventional transmission signal processing circuit, the stuff execution judgement circuit is given the input stuff threshold value which is constant or fixed no matter whether the TU of the input frame has any signal rate. In other words, the input stuff threshold value is constant or fixed for the TU's of four sorts (namely, the TU-11, the TU-12, the TU-2, and the TU-3). This results in an increase of a delay required from a write timing of the TU in the memory to a read timing of the TU under consideration out of the memory when the TU under consideration has a particular signal rate selected from the bit rates of the TU's of four sorts. This is because optimum stuff threshold values are different from one another for the signal rates of the TU's of four sorts.

SUMMARY OF THE INVENTION

It is therefore an object of this invention to provide a transmission signal processing circuit which can minimize a delay required from a write timing of a tributary unit (TU) of an input transmission signal in a memory to a read timing of the tributary unit out of the memory no matter when the tributary unit has any of signal rates for the tributary units of a plurality of sorts.

It is another object of this invention to provide a transmission signal processing circuit of the type described, which can determine an optimum stuff threshold value corresponding to a sort of the tributary unit included in the input transmission signal.

Other objects of this invention will become clear as the description proceeds.

On setting forth the gist of this invention, it is possible to understand that a transmission signal processing circuit is supplied with an input transmission signal synchronized with input clock pulses. The input transmission signal comprises an input frame which is synchronized with an input frame pulse and which includes a tributary unit. The transmission signal processing circuit is further supplied with output clock pulses and an output frame pulse for processing the input transmission signal into an output transmission signal comprising an output frame including the tributary unit by transferring the tributary unit from the input frame onto the output frame of the output transmission signal with the output transmission signal synchronized with the output clock pulses and with the output frame synchronized with the output frame pulse. The transmission signal processing circuit comprises: a deriving circuit for deriving the input clock pulses and the input frame pulse from the input transmission signal; a memory supplied with the input transmission signal; a recognition circuit supplied with the input transmission signal and connected to the deriving circuit for recognizing the tributary unit of the input frame in response to the input clock pulses and the input frame pulse to produce a location signal representative of a location of the tributary unit in the input frame; a write controller connected to the deriving circuit and the recognition circuit for controlling writing of the tributary unit of the input frame in the memory in response to the input clock pulses, the input frame pulse, and the location signal by supplying a write address signal to the memory; a read controller supplied with the output clock pulses and the output frame pulse for controlling reading of the tributary unit out of the memory in response to a stuff request signal by supplying a read address signal to the memory; a stuff execution judgement circuit given an input stuff threshold value and connected to the write controller and the read controller for judging whether or not a stuff operation should be executed by comparing a difference between the write address signal and the read address signal with the input stuff threshold value, the stuff execution judgement circuit producing the stuff request signal when the stuff execution judgement circuit judges that the stuff operation should be executed; and an output transmission signal producing circuit supplied with the output clock pulses and the output frame pulse and connected to the memory for producing the output transmission signal.

According to this invention, the recognition circuit of the above-understood transmission signal processing circuit further produces a type signal representative of a sort of the tributary unit in the input frame.

The above-understood transmission signal processing circuit further comprises: a threshold determining circuit connected to the recognition circuit for determining an optimum stuff threshold value in response to the type signal to produce the optimum stuff threshold value as the input stuff threshold value.

DESCRIPTION OF THE PREFERRED EMBODIMENT

Figure 1:
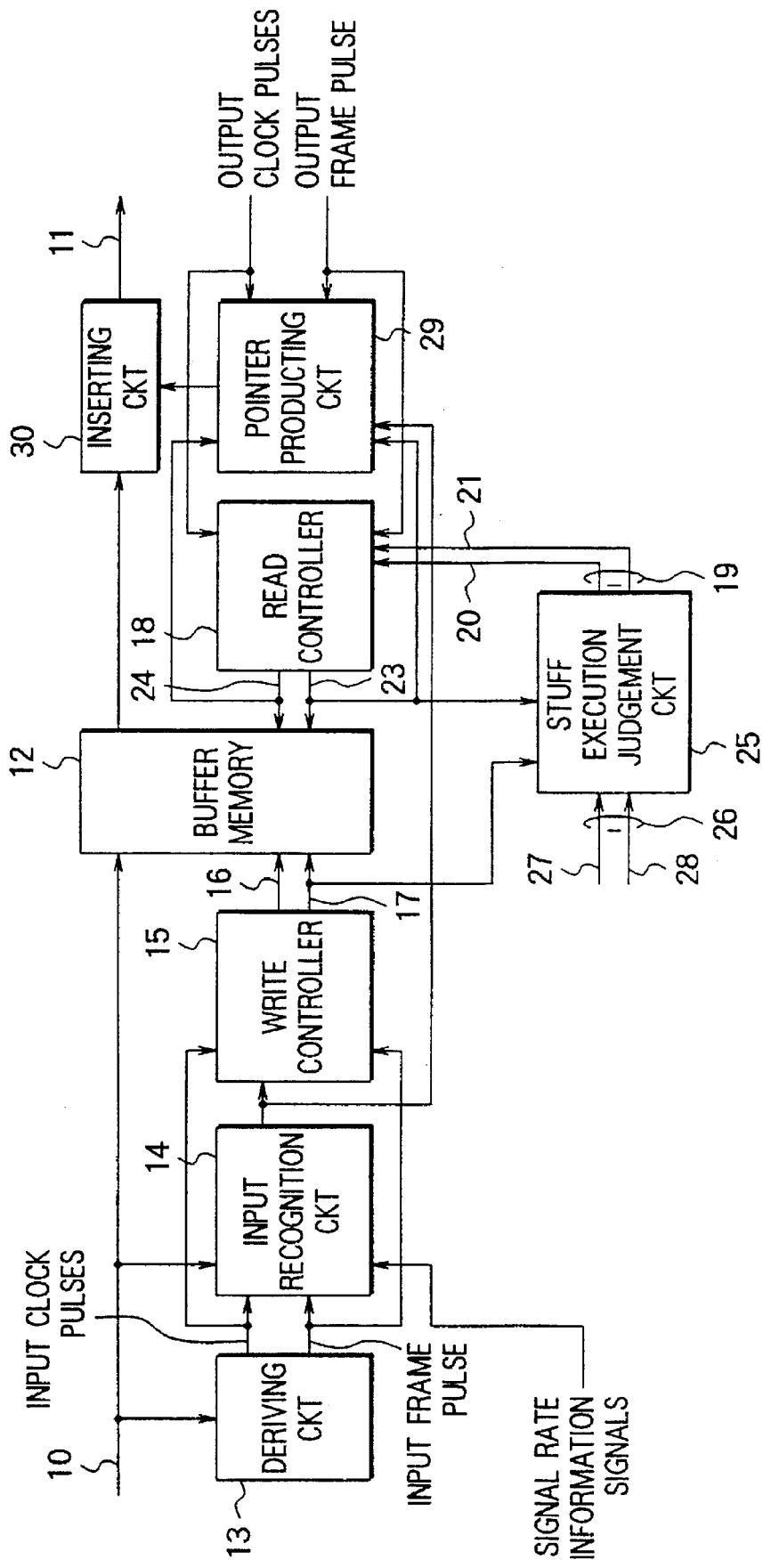
FIG. 1 is a block diagram of a conventional transmission signal processing circuit.

Referring to FIG. 1, a conventional transmission signal processing circuit will first be described for a better understanding of this invention. The transmission signal processing circuit is equivalent to the transmission signal processing circuit described in the preamble of this instant specification and is substantially equivalent to a TU (namely, a tributary unit) pointer processing circuit disclosed in Japanese Unexamined Patent Publication No. H02-81527 (namely, 81527/1990).

In FIG. 1, the transmission signal processing circuit is for use in a synchronous digital multiplexing transmission device (not shown) and is supplied from a transmission line (not shown) with an input transmission signal 10 synchronized with input clock pulses. The input transmission signal comprises an input frame (namely, a transmission line frame) which is synchronized with a input frame pulse and which includes a TU. The transmission signal processing circuit is further supplied with output clock pulses and an output frame pulse from the synchronous digital multiplexing transmission device. The transmission signal processing circuit processes the input transmission signal into an output transmission signal 11 comprising an output frame (namely, a device frame) including the tributary unit by transferring the tributary unit from the input frame onto the output frame of the output transmission signal 11 with the output transmission signal 11 synchronized with the output clock pulses and with the output frame synchronized with the output frame pulse.

Figure 2:
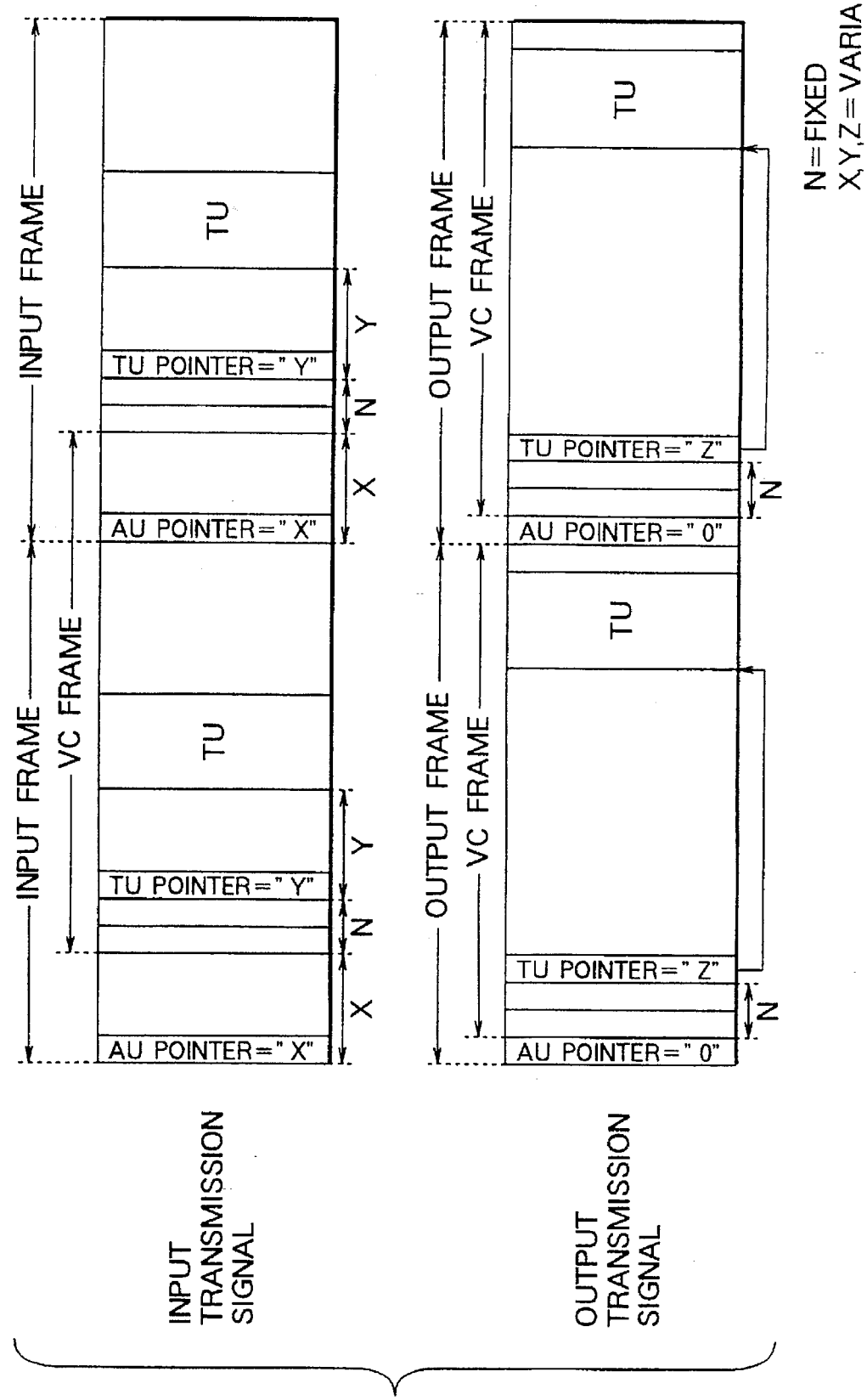
FIG. 2 is a time chart for use in describing structures of an input transmission signal and an output transmission signal.

Turning to FIG. 2, the input transmission signal 10 of FIG. 1 is depicted along a first or top row. The input transmission signal includes an AU (administration unit) pointer which designates a location X of a leading edge of a VC (virtual container) frame in the input frame. The input transmission signal further includes a TU pointer in the input frame with a fixed interval N left between the leading edge of the VC frame and the TU pointer. The TU pointer designates another location Y of a leading edge of the TU in the input frame. An input pointer described in the preamble of the instant specification corresponds to the TU pointer which designates the location Y of the leading edge of the TU in the input frame.

In FIG. 2, the output transmission signal 11 of FIG. 1 is depicted along a second or bottom row. The output transmission signal includes the AU pointer which designates the location 0 (zero) of the leading edge of the VC frame in the output frame. The output transmission signal further includes the TU pointer in the output frame with the fixed interval N left between the leading edge of the VC frame and the TU pointer. The TU pointer designates still another location Z of the leading edge of the TU in the output frame. An output pointer described in the preamble of the instant specification corresponds to the TU pointer which designates the location Z of the leading edge of the TU in the output frame.

Thus, the transmission signal processing circuit transfers the TU from the input frame onto the output frame with the leading edge of the VC frame shifted so as to make the AU pointer of the output frame designate the location 0. In this event, the transmission signal processing circuit also carries out renewal of the TU pointer from the input pointer to the output pointer. The transmission signal processing circuit is therefore called a TU pointer processing circuit as described in the preamble of the instant specification.

It will be assumed that the TU of the input frame has one of a plurality of predetermined signal rates of the TU's of four sorts which are a TU-11, a TU-12, a TU-2, and a TU-3 and which are mentioned in the preamble of the instant specification. It will also be assumed that the transmission signal processing circuit of FIG. 1 should deal with the TU's of four sorts (namely, the TU-11, the TU-12, the TU-2, and the TU-3).

Turning back to FIG. 1 again with reference to FIG. 2 continued, the transmission signal processing circuit comprises a buffer memory 12 supplied with the input transmission signal 10. A deriving circuit 13 derives the input clock pulses and the input frame pulse from the input transmission signal 10.

An input recognition circuit 14 is supplied with the input transmission signal 10 and with a plurality of signal rate information signals representative of the predetermined signal rates of the TU's of four sorts (namely, the TU-11, the TU-12, the TU-2, and the TU-3). Connected to the deriving circuit 13, the input recognition circuit 14 recognizes the TU of the input frame in response to the input clock pulses and the input frame pulse and with reference to the TU pointer of the input frame. The input recognition circuit 14 furthermore recognizes whether or not the TU of the input frame has a signal rate which corresponds to one of the predetermined signal rates represented by the signal rate information signals. In other words, the input recognition circuit 14 recognizes whether or not the TU of the input frame corresponds to one of the TU's of four sorts (namely, the TU-11, the TU-12, the TU-2, and the TU-3) with reference to the signal rate information signals. When the input recognition circuit 14 recognizes that the TU of the input frame corresponds to one of the TU's of four sorts (namely, the TU-11, the TU-12, the TU-2, and the TU-3), the input recognition circuit 14 produces a location signal representative of a location of the TU in the input frame.

A write controller 15 is connected to the deriving circuit 13 and the input recognition circuit 14. The write controller 15 controls writing of the TU of the input frame in the buffer memory 12 in response to the input clock pulses, the input frame pulse, and the location signal by supplying a write instruction signal 16 and a write address signal 17 to the buffer memory 12. Thus, the write controller 15 supplies the write instruction signal 16 and the write address signal 17 to the buffer memory 12 so that only the TU of the input frame is written in the buffer memory 12. A read controller 18 is supplied with the output clock pulses and the output frame pulse. The read controller 18 controls reading of the TU out of the buffer memory 12 in response to a stuff request signal 19 (which is either a positive stuff request signal 20 or a negative stuff request signal 21) by supplying a read address signal 23 and a read instruction signal 24 to the buffer memory 12. By supplying the read address signal 23 and the read instruction signal 24 to the buffer memory 12, the TU is read out of the buffer memory 12.

A stuff execution judgement circuit 25 is given an input stuff threshold value 26 which is a combination of an input positive stuff threshold value 27 and an input negative stuff threshold value 28 which is greater than the input positive stuff threshold value 27. Connected to the write controller 15 and the read controller 18, the stuff execution judgement circuit 25 judges whether or not a positive stuff operation should be executed by comparing a phase difference between the write address signal 17 and the read address signal 23 with the input positive stuff threshold value 27. The stuff execution judgement circuit 25 produces the positive stuff request signal 20 as the stuff request signal 19 when the stuff execution judgement circuit 25 judges that the positive stuff operation should be executed. More specifically, the stuff execution judgement circuit 25 produces the positive stuff request signal 20 when the phase difference is less than the input positive stuff threshold value 27. Responsive to the positive stuff request signal 20, the read controller 18 interrupts a reading operation to thereby increase the phase difference. As a result, a phase of an output signal of the buffer memory 12 becomes late.

The stuff execution judgement circuit 25 furthermore judges whether or not a negative stuff operation should be executed by comparing the phase difference with the input negative stuff threshold value 28. The stuff execution judgement circuit 25 produces the negative stuff request signal 21 as the stuff request signal 19 when the stuff execution judgement circuit 25 judges that the negative stuff operation should be executed. More specifically, the stuff execution judgement circuit 25 produces the negative stuff request signal 21 when the phase difference is greater than the input negative stuff threshold value 28. Responsive to the negative stuff request signal 21, the read controller 18 carries out inverse control to decrease the phase difference.

A pointer producing circuit 29 is supplied with the output clock pulses and the output frame pulse and supplied with the read address signal. 23 and the read instruction signal 24 from the read controller 18. Further supplied with the locating signal from the input recognition circuit 14, the pointer producing circuit 29 produces the output pointer equivalent to the TU pointer which designates the location Z of the leading edge of the TU in the output frame of FIG. 2. An inserting circuit 30 is connected to the buffer memory 12 and the pointer producing circuit 29. The inserting circuit 30 inserts the output pointer in the output frame which includes the TU read out of the buffer memory 12. The inserting circuit 30 thereby produces the output transmission signal 11 which includes both the output pointer and the TU in the output frame.

Thus, a combination of the pointer producing circuit 29 and the inserting circuit 30 is operable as an output transmission signal producing circuit. Supplied with the output clock pulses and the output frame pulse and connected to the buffer memory 12, the output transmission signal producing circuit produces the output transmission signal 11.

In the transmission signal processing circuit of FIG. 1, the stuff execution judgement circuit 25 is given a constant input positive stuff threshold value 27 and a constant input negative stuff threshold value 28 no matter whether the TU of the input transmission signal 10 has any signal rate. That is, the input stuff threshold value 26 is constant or fixed for the TU's of four sorts (namely, the TU-11, the TU-12, the TU-2, and the TU-3). This results in an increase of a delay required from a write timing of the TU in the buffer memory 12 to a read timing of the TU under consideration out of the buffer memory 12 when the TU under consideration has a particular signal rate as mentioned above.

Figure 3:
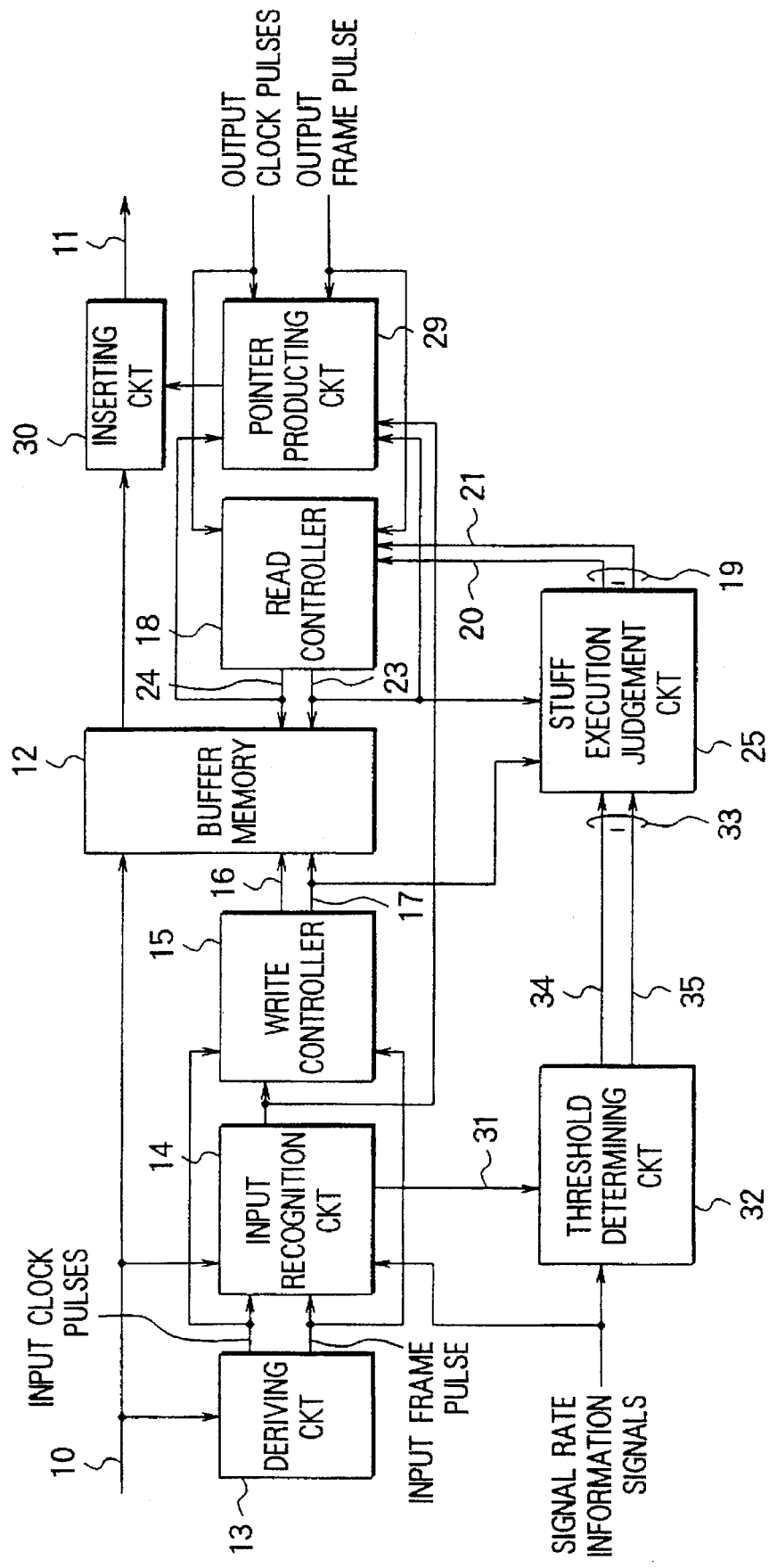
FIG. 3 is a block diagram of a transmission signal processing circuit according to an embodiment of this invention.

Turning to FIG. 3, description will proceed to a transmission signal processing circuit according to an embodiment of this invention. The transmission signal processing circuit of FIG. 3 is similar to the transmission signal processing circuit of FIG. 1 expect for the following. That is, the input recognition circuit 14 of the transmission signal processing circuit of FIG. 3 further produces a type signal 31 representative of a type of the TU in the input frame. The transmission signal processing circuit of FIG. 3 further comprises a threshold determining circuit 32. Supplied with the signal rate information signals and connected to the input recognition circuit 14, the threshold determining circuit 32 determines in response to the type signal 31 an optimum stuff threshold value 33 which is a combination of an optimum positive stuff threshold value 34 and an optimum negative stuff threshold value 35. The threshold determining circuit 32 thereby produces the optimum stuff threshold value 33 as the input stuff threshold value of the stuff execution judgement circuit 25.

Figure 4:
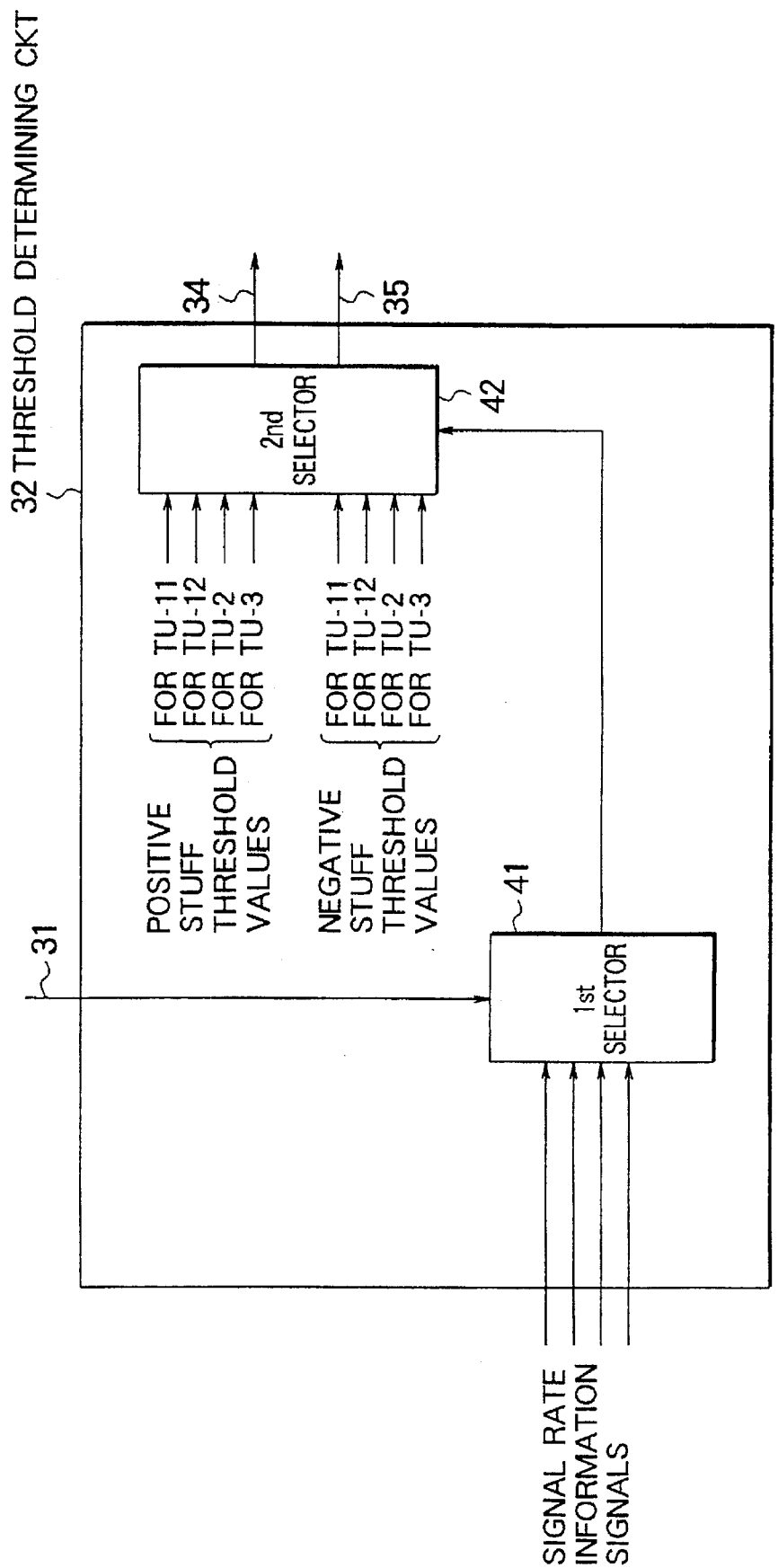
FIG. 4 is a block diagram of a threshold determining circuit which is used in the transmission signal processing circuit illustrated in FIG. 3.

Turning to FIG. 4, the threshold determining circuit 32 includes first and second selectors 41 and 42. The first selector 41 is given the signal rate information signals representative of the predetermined signal rates of the TU's of four sorts (namely, the TU-11, the TU-12, the TU-2, and the TU-3). Connected to the input recognition circuit 14, the first selector 41 selects one of the signal rate information signals as a selected rate information signal. The above-mentioned one of the signal rate information signals corresponds to the sort of the TU that is represented by the sort signal 31.

The second selector 42 is given a plurality of predetermined positive stuff threshold values in correspondence to the predetermined signal rates of the TU's of four sorts (namely, the TU-11, the TU-12, the TU-2, and the TU-3) and is also given a plurality of predetermined negative stuff threshold values in correspondence to the predetermined signal rates of the TU's of four sorts (namely, the TU-11, the TU-12, the TU-2, and the TU-3). That is, the second selector 42 is given the predetermined positive stuff threshold values for the TU-11, the TU-12, the TU-2, and the TU-3 and is also given the predetermined negative stuff threshold values for the TU-11, the TU-12, the TU-2, and the TU-3. Connected to the first selector 41, the second selector 42 selects, as the optimum positive stuff threshold value 34 and the optimum negative stuff threshold value 35, one of the predetermined positive stuff threshold values for the TU-11, the TU-12, the TU-2, and the TU-3 and one of the predetermined negative stuff threshold values for the TU-11, the TU-12, the TU-2, and the TU-3. The above-mentioned one of the predetermined positive stuff threshold values and the above-mentioned one of the predetermined negative stuff threshold values correspond to the selected rate information signal produced by the first selector 41.

What is claimed is:

1. A transmission signal processing circuit supplied with an input transmission signal synchronized with input clock pulses, said input transmission signal having an input frame which is synchronized with an input frame pulse and which includes a tributary unit, said transmission signal processing circuit being further supplied with output clock pulses and an output frame pulse for processing said input transmission signal into an output transmission signal having an output frame including said tributary unit by transferring said tributary unit from said input frame onto said output frame of the output transmission signal with said output transmission signal synchronized with said output clock pulses and with said output frame synchronized with said output frame pulse, said transmission signal processing circuit comprising:

a deriving circuit for deriving said input clock pulses and said input frame pulse from said input transmission signal; a memory supplied with said input transmission signal; a recognition circuit supplied with said input transmission signal and connected to said deriving circuit for recognizing the tributary unit of said input frame in response to said input clock pulses and said input frame pulse to produce a location signal representative of a location of said tributary unit in said input frame; a write controller connected to said deriving circuit and said recognition circuit for controlling writing of the tributary unit of said input frame in said memory in response to said input clock pulses, said input frame pulse, and said location signal by supplying a write address signal to said memory; a read controller supplied with said output clock pulses and said output frame pulse for controlling reading of said tributary unit out of said memory in response to a stuff request signal by supplying a read address signal to said memory; a stuff execution judgement circuit given an input stuff threshold value and connected to said write controller and said read controller for judging whether or not a stuff operation should be executed by comparing a difference between said write address signal and said read address signal with said input stuff threshold value, said stuff execution judgement circuit producing said stuff request signal when said stuff execution judgement circuit judges that said stuff operation should be executed; and an output transmission signal producing circuit supplied with said output clock pulses and said output frame pulse and connected to said memory for producing said output transmission signal;

said recognition circuit further produces a type signal representative of a type of the tributary unit in said input frame;

said transmission signal processing circuit further including:

a threshold determining circuit connected to said recognition circuit for determining an optimum stuff threshold value in response to said type signal to produce said optimum stuff threshold value as said input stuff threshold value.

2. A transmission signal processing circuit as claimed in claim 1, the tributary unit having one of a plurality of predetermined signal rates in said input frame, wherein said threshold determining circuit comprises:

a first selector given a plurality of signal rate information signals representative of said predetermined signal rates and connected to said recognition circuit for selecting one of said signal rate information signals as a selected rate information signal, said one of the signal rate information signals corresponding to the type of said tributary unit that is represented by said type signal; and a second selector given a plurality of predetermined stuff threshold values corresponding to said predetermined signal rates and connected to said first selector for selecting one of said predetermined stuff threshold values as said optimum stuff threshold value, said one of the predetermined stuff threshold values corresponding to said selected rate information signal.

3. A transmission signal processing circuit as claimed in claim 1, said stuff execution judgement circuit being given an input positive stuff threshold value and an input negative stuff threshold value as said input stuff threshold vague, said stuff execution judgement circuit judging whether or not a positive stuff operation should be executed by comparing said difference with said input positive stuff threshold value, said stuff execution judgement circuit producing a positive stuff request signal as said stuff request signal when said stuff execution judgement circuit judges that said positive stuff operation should be executed, said stuff execution judgement circuit judging whether or not a negative stuff operation should be executed by comparing said difference with said input negative stuff threshold value, said stuff execution judgement circuit producing a negative stuff request signal as said stuff request signal when said stuff execution judgement circuit judges that said negative stuff operation should be executed, wherein:

said threshold determining circuit determines an optimum positive stuff threshold value and an optimum negative stuff threshold value as said optimum stuff threshold value in response to said type signal to produce said optimum positive stuff threshold value and said optimum negative stuff threshold value as said input positive stuff threshold value and said input negative stuff threshold value.

4. A transmission signal processing circuit as claimed in claim 3, the tributary unit having one of a plurality of predetermined signal rates in said input frame, wherein said threshold determining circuit comprises:

a first selector given a plurality of signal rate information signals representative of said predetermined signal rates and connected to said recognition circuit for selecting one or said signal rate information signals as a selected rate information signal, said one of the signal rate information signals corresponding to the type of said tributary unit that is represented by said type signal; and a second selector given a plurality of predetermined positive stuff threshold values in correspondence to said predetermined signal rates and a plurality of predetermined negative stuff threshold values in correspondence to said predetermined signal rates and connected to said first selector for selecting one of said predetermined positive stuff threshold values as said optimum positive stuff threshold value and one of said predetermined negative stuff threshold values as said optimum negative stuff threshold value, said one of the predetermined positive stuff threshold values and said one of the predetermined negative stuff threshold values corresponding to said selected rate information signal.

* * * * *